United States Patent [19]
Gullett

[11] Patent Number: 5,846,416
[45] Date of Patent: Dec. 8, 1998

[54] FLUID FILTER HAVING A REUSABLE FILTER HOUSING AND A REPLACEABLE CORELESS FILTER ELEMENT

[75] Inventor: David F. Gullett, Peoria, Ill.

[73] Assignee: Caterpillar Inc., Peoria, Ill.

[21] Appl. No.: 653,600

[22] Filed: May 24, 1996

[51] Int. Cl.$^6$ ................................................. B01D 35/02
[52] U.S. Cl. .................. 210/232; 210/248; 210/440; 210/441; 210/442; 210/450; 210/DIG. 17
[58] Field of Search ................................ 210/232, 248, 210/440, 441, 450, 453, 455, 457, 442, DIG. 17; 123/196 A

[56] References Cited

U.S. PATENT DOCUMENTS 3,625,363 12/1971 Eberle ........................................ 210/441
5,589,060 12/1996 Gerbert et al. ........................... 210/457

*Primary Examiner*—Matthew O. Savage
*Attorney, Agent, or Firm*—Pankaj M. Khosla

[57] ABSTRACT

A reusable fluid filter assembly comprises a cylindrical housing, a top plate assembly, a top plate attachment member, and a replaceable coreless filter element. The housing has means for removably connecting the housing to the top plate, and a hollow central core having an open first end and being connected to the closed end of the housing at the second end. The central core has a plurality of fluid outlet perforations. The top plate has a rim, fluid inlet means and fluid outlet means extending through the top plate. The top plate attachment member has a tubular shape, and a fluid outlet port extending through it. The coreless filter element having annular end caps on first and second open ends is disposed in the housing. The fluid inlet means of the top plate are in fluid communication with a fluid inlet chamber defined by the filter element and housing. The central core extends into the first open end of the filter and the hollow cylindrical chamber of the filter element. The fluid outlet perforations of the central core are in fluid communication with the hollow cylindrical chamber. The central core sealingly engages the first and second open ends of the filter element. The open first end of the hollow central core sealingly engages the fluid outlet port extending through the top plate attachment member.

22 Claims, 8 Drawing Sheets

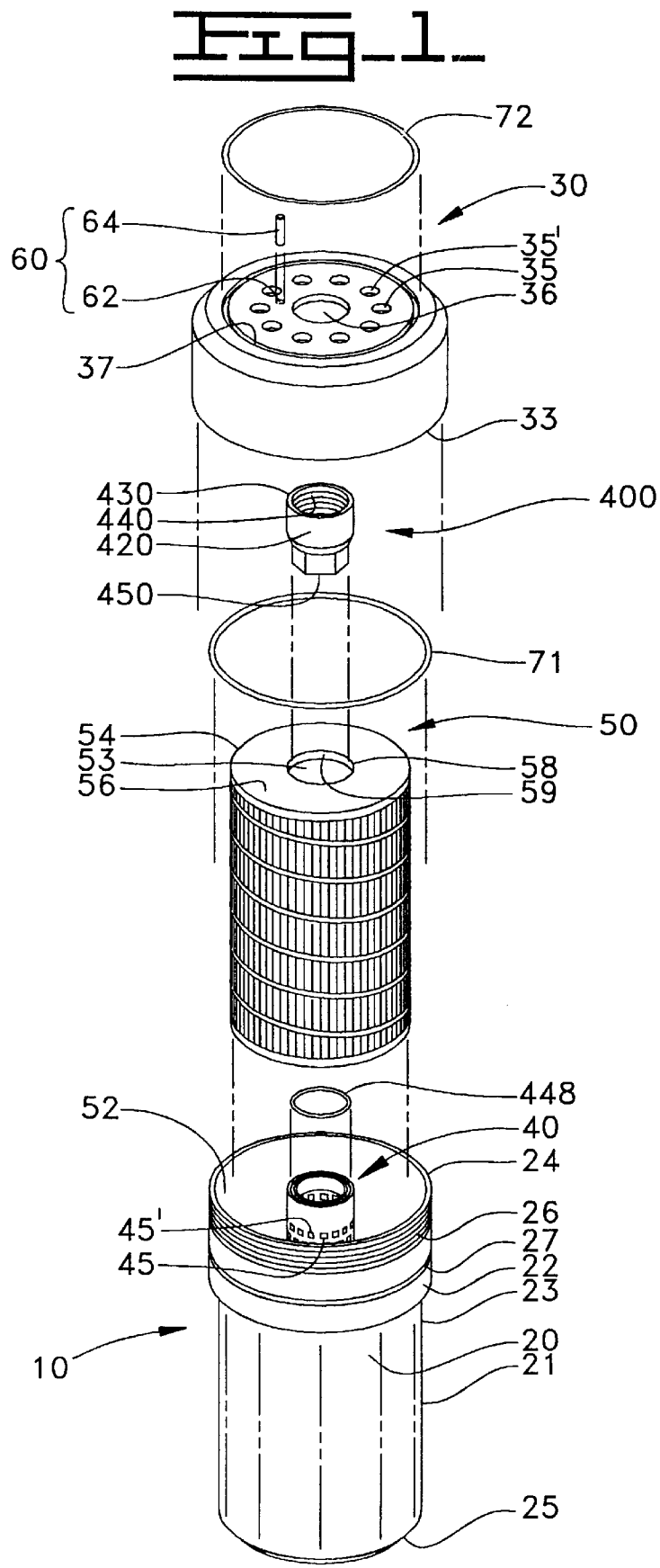

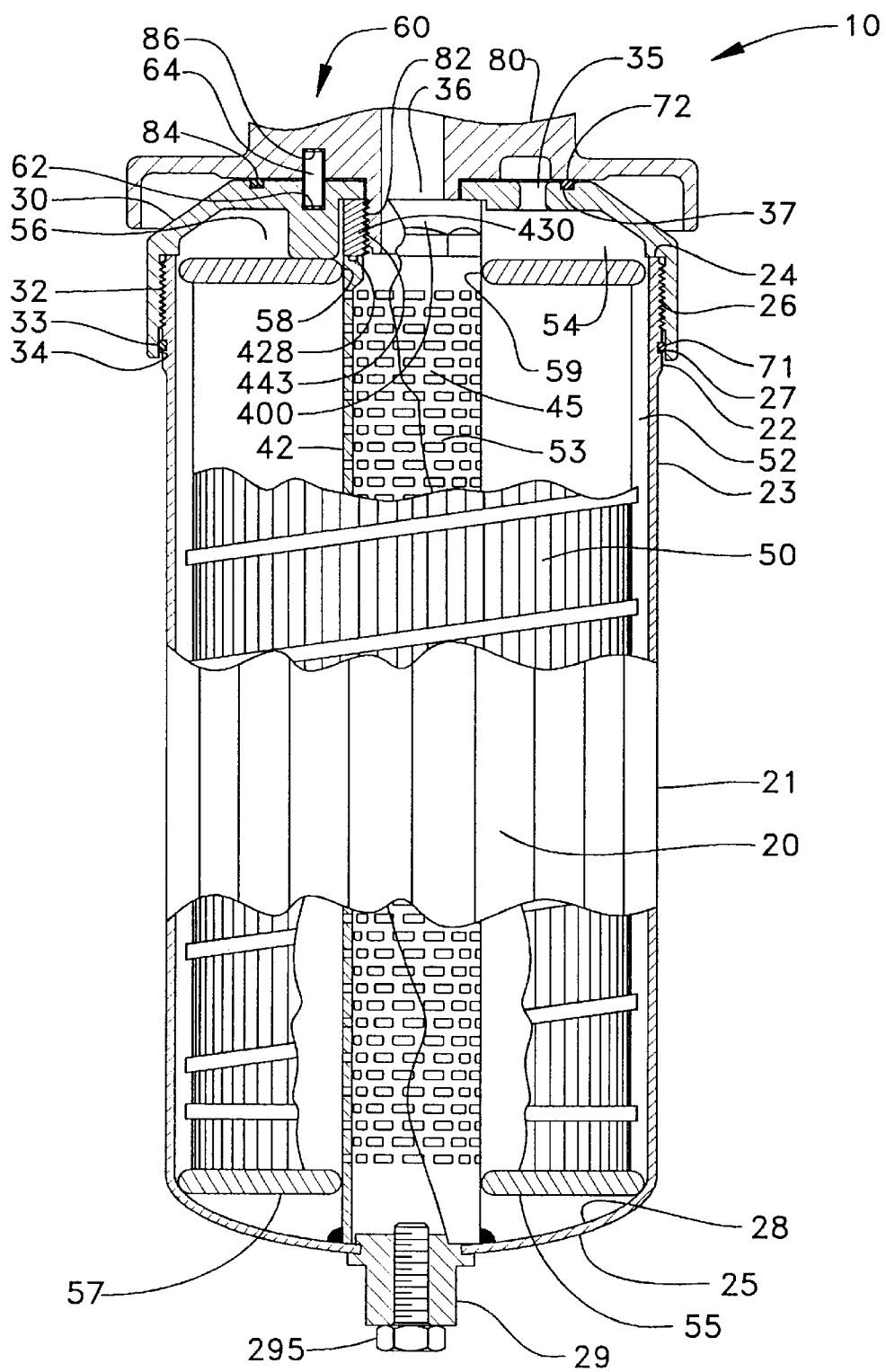
Fig_2_

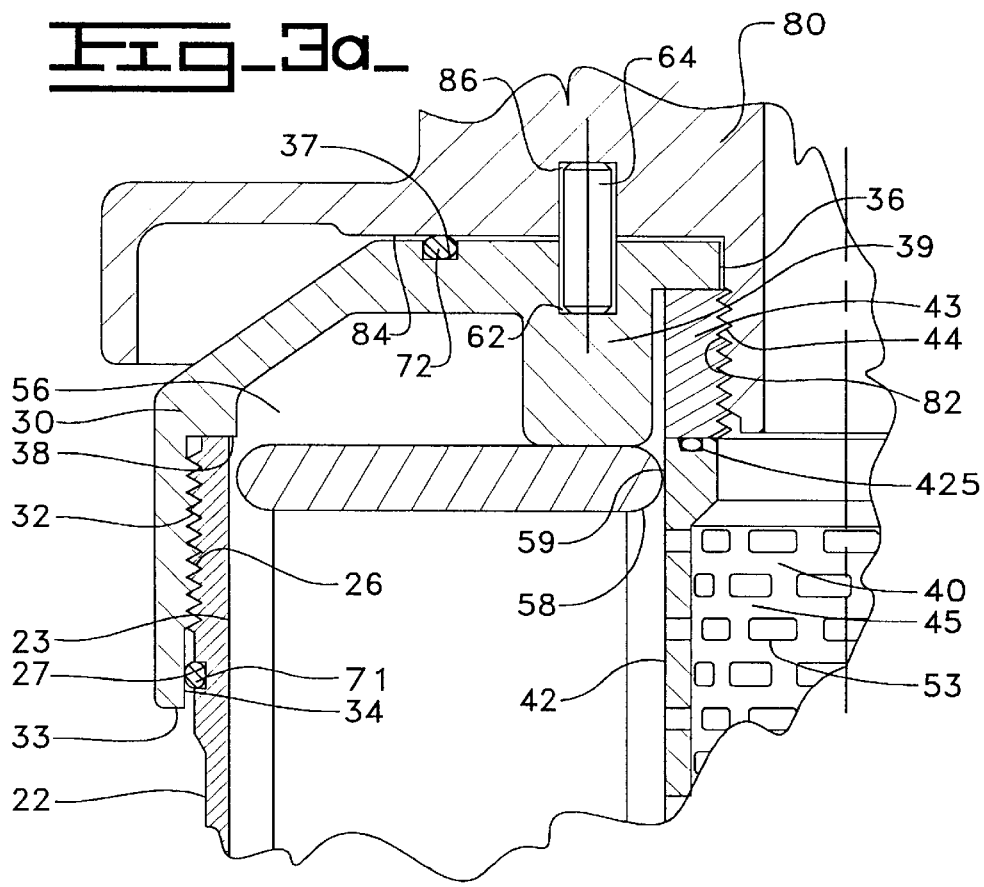
Fig_3a_
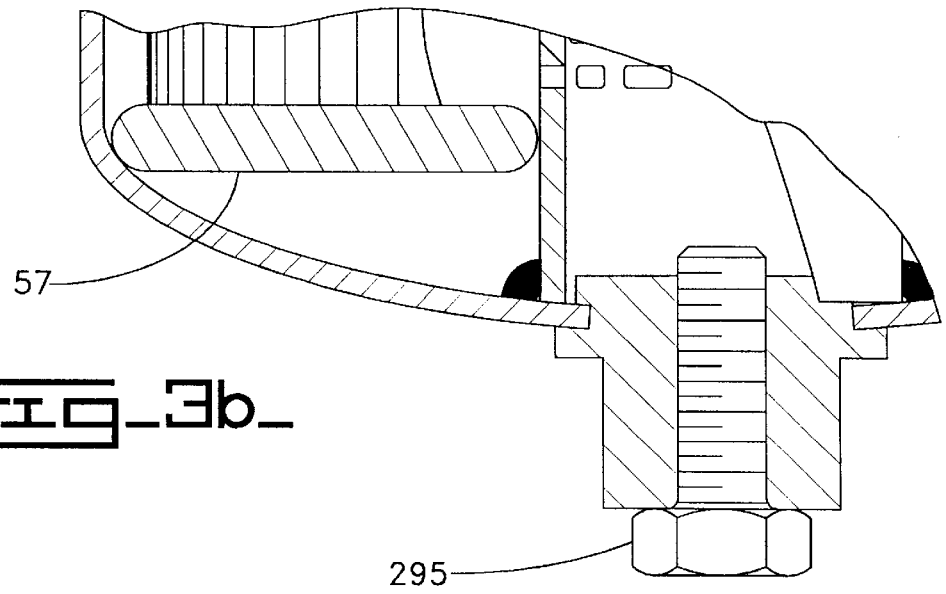
Fig_3b_

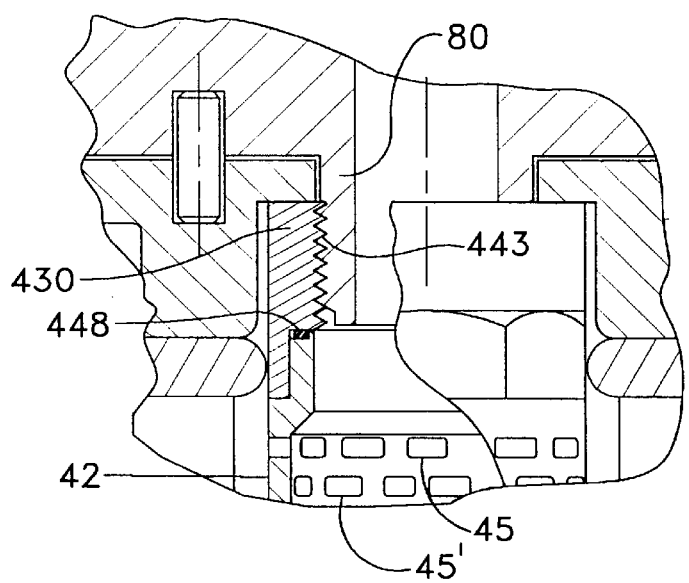
Fig-4-
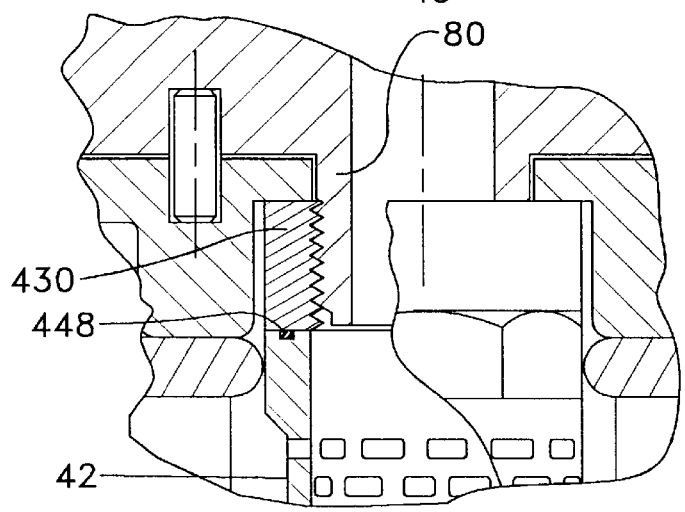
Fig-5-
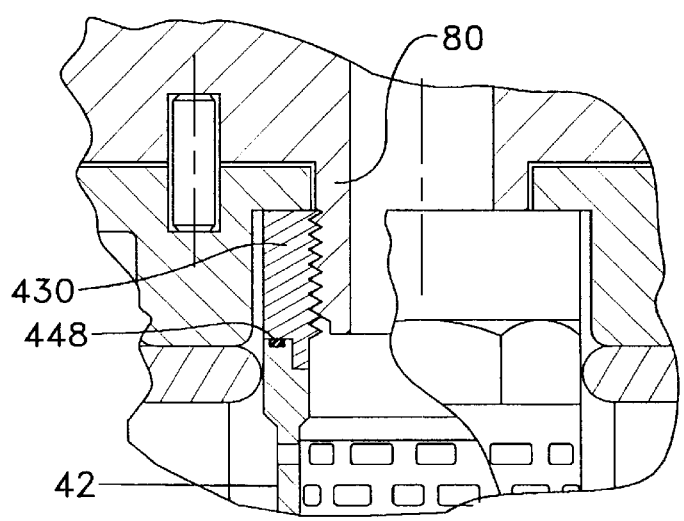
Fig-6-

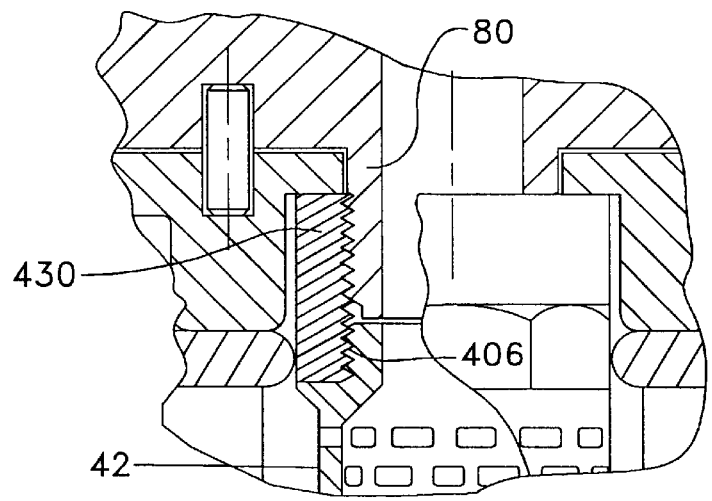
Fig_7_
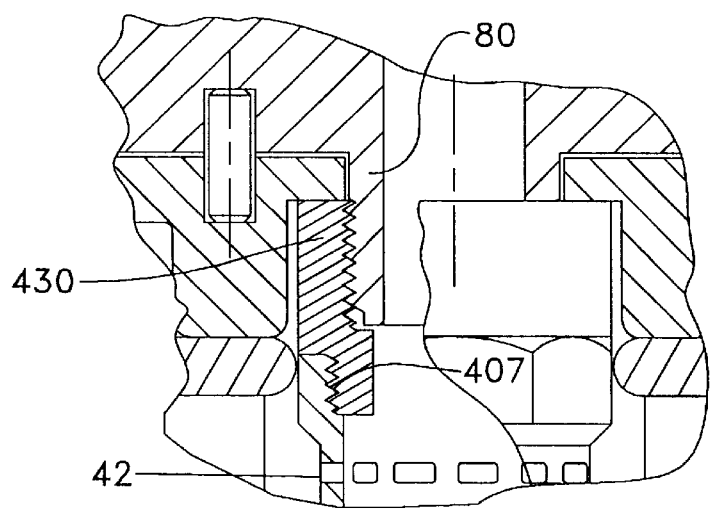
Fig_8_

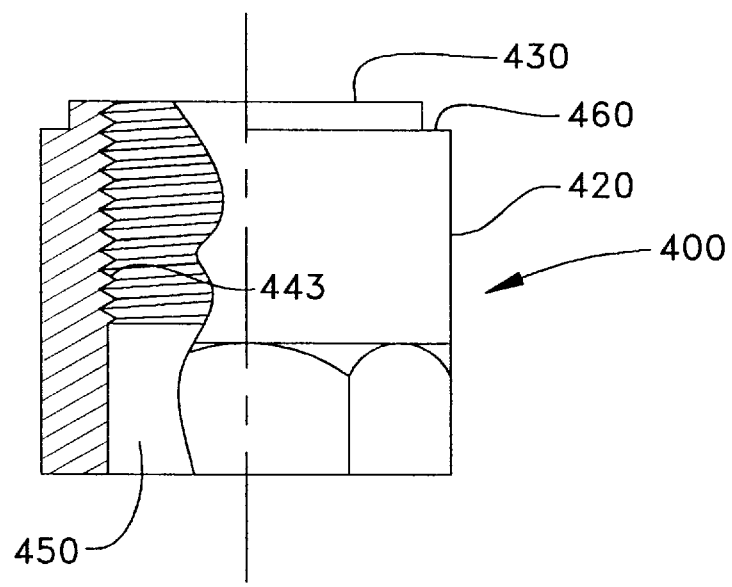
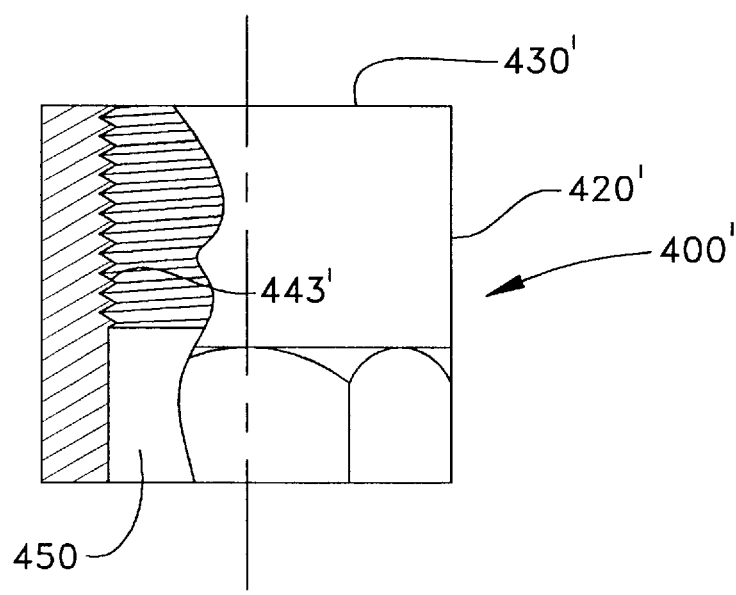

Fig_13a_
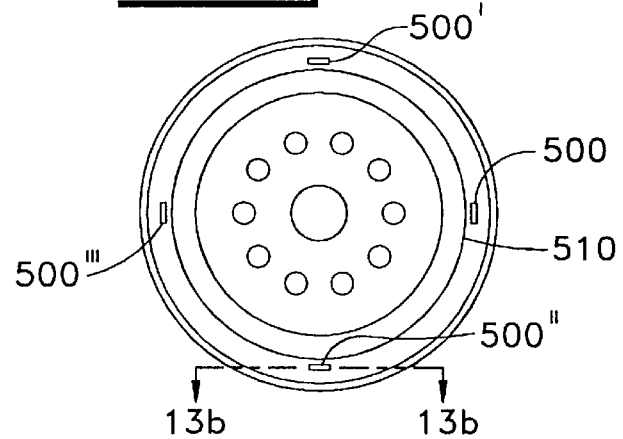
Fig_13b_
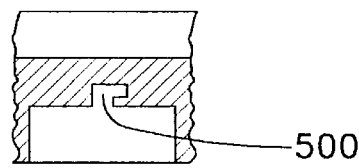
Fig_13c_
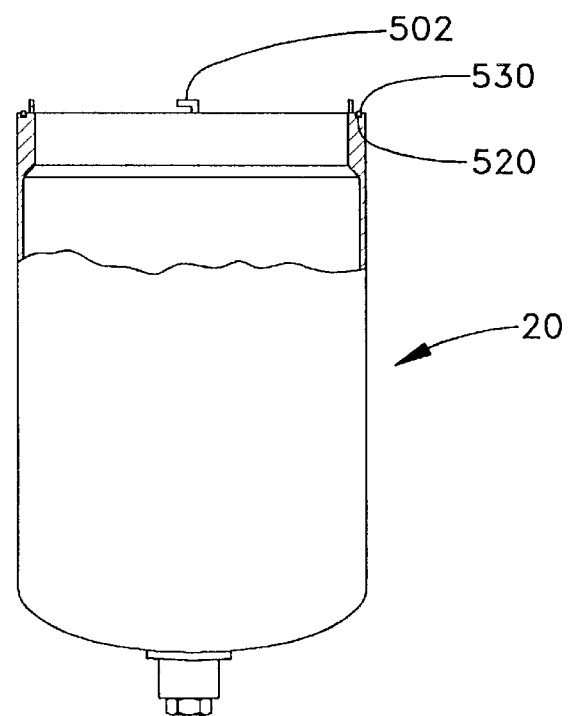

FLUID FILTER HAVING A REUSABLE FILTER HOUSING AND A REPLACEABLE CORELESS FILTER ELEMENT

TECHNICAL FIELD

The present invention relates generally to fluid filters, and more particularly to a spin-on type fluid filter having a reusable filter housing and a replaceable coreless filter element.

BACKGROUND ART

Filter assemblies for filtering liquids such as engine oil, hydraulic oil and fuel are well known in the art. An oil filter assembly is typically installed in the oil lines of an internal combustion engines to remove grit and other contaminants from the engine lubricating oil to provide a longer engine life and improved engine performance.

A typical oil filter assembly has a housing which contains a filter element used for filtering the oil as it circulates through the housing. The housing ordinarily has a first end adapted for coupling the filter assembly to the engine block of the internal combustion engine by means of an internally threaded fluid exit port that threads onto a corresponding externally threaded configuration on the engine block. The housing also has a second end which is ordinarily closed. The fluid exit port is ordinarily centrally located in a housing cover which is permanently, peripherally attached to the first end of the housing. Contaminated oil flows into the filter housing through fluid inlet holes located in the cover and surrounding the fluid exit port, and clean, filtered oil flows out of the filter housing through fluid exit port. The filter housing is sealed against the engine block by using an elastomeric gasket which surrounds the inlet holes and the exit port. Fluid filters with such an attachment configuration are generally referred to in the art as "spin-on" type filters.

Disposable or "throw away" type fluid filters are known in the art. The filter element is permanently sealed inside the filter housing. When the filter element has become clogged, the entire filter assembly is removed and discarded and a new filter assembly is put in its place. This type of a filter represents a waste of natural resources, labor and materials because an entirely new filter assembly must be used each time the old filter assembly is serviced, even though it is only the filter element that has been expended and the other parts of the filter, such as the housing, top plate and seals have not yet exceeded their useful life.

A fluid filter assembly having a detachable cover and housing to permit the replacement of the filter element is also known in the art. U.S. Pat. No. 5,342,519 discloses such a fluid filter assembly for engine oil application, for example.

A common problem with reusable filter units such as of the type described above, is that the replaceable filter element has a hollow central core, formed of a perforated tube, as an integral part of the element. This tube is typically constructed from a metal, such as steel or even paper reinforced with a resin, such as a phenolic resin for example. When the filter element has to be periodically replaced, it is only because the filtration media has reached the limit of its filtration capacity and not because the center tube has reached the end of its service life. Usually, the perforated center tube has a much longer service life available because it comes into contact with only the clean filtered oil that flows through it. When the entire filter element is thrown away, a perfectly functional and useful center tube is also thrown away. This represents a waste of natural resources and an undue burden on the landfills and the environment. Although one method of disposal of used filter elements is by incineration in a furnace, this method is most effective only where the center tubes are made of a resin impregnated paper based material. If the center tube is made of metal, as is the case in a majority of filter elements, incineration of the filter element still does not resolve the problem of the disposal of metal center tubes. Hence, the filter industry is presented with the challenging task of designing and manufacturing environmentally friendly filters in the face of pending tougher environmental regulations.

It has been desirable to have a reusable filter housing design that allows for environmentally safe collection and disposal of the dirty oil and also allow for safe removal of the replaceable filter element. It has further been desirable to have a filter assembly having a reusable center tube that allows the use of a coreless filter element to avoid the unnecessary waste of materials and natural resources. It has also been desirable to have a replaceable filter housing design that facilitates quick and easy removal of the expended filter element and installation of a new filter element to avoid the unnecessary waste of time and labor.

The present invention is directed to overcome one or more problems of the heretofore utilized replaceable filter element and reusable filter housing assemblies.

DISCLOSURE OF THE INVENTION

In one aspect of the present invention, a reusable fluid filter assembly is provided. The filter assembly comprises a cylindrical housing having an annular peripheral wall, an open end, a closed end, and connecting means for removably connecting the housing to a top plate assembly. The cylindrical housing further includes a hollow central core having a tubular shape, an inner surface, an open first end having a first outer surface, a middle portion having a middle outer surface and a plurality of fluid outlet perforations extending from the inner surface to the middle outer surface, and a second end having a second outer surface. The first end is disposed in the open end of the housing. The second end is connected to the closed end of the cylindrical housing.

The filter assembly further comprises a top plate assembly having a rim, fluid inlet means and fluid outlet means extending through the top plate assembly, and connecting means for removably connecting the top plate assembly to the housing.

The filter assembly also comprises a top plate attachment member having a tubular shape, an outer surface, a pilot end having internal threads for threading onto corresponding external threads on a filter mounting base, and a fluid outlet port extending through the attachment member.

The filter assembly still further comprises a replaceable coreless filter element disposed in the housing to define a fluid inlet chamber between the filter element and the housing. The filter element has a hollow cylindrical fluid outlet chamber which opens to a first open end of the filter element, allowing filtered fluid to flow therefrom, and having a second open end. The filter element has an outer diameter that is smaller than the inner diameter of the housing to allow removal of the filter element through the open end of the housing. The filter element has an inner diameter that is larger than the outer diameter of the hollow central core to allow the hollow cylindrical chamber to accept the hollow central core therein.

The fluid inlet means of the top plate are in fluid communication with the fluid inlet chamber defined by the filter element and housing. The hollow central core extends into the first open end and the hollow cylindrical chamber of the filter element. The fluid outlet perforations of the hollow central core are in fluid communication with the hollow cylindrical chamber of the filter element. The first and second outer surfaces of the hollow central core sealingly engage the first and second open ends of the filter element respectively. The open first end of the hollow central core sealingly engages the fluid outlet port extending through the attachment member.

BRIEF DESCRIPTION OF THE DRAWINGS

FIG. 1 is an exploded perspective view of a reusable fluid filter assembly including a cylindrical housing, a top plate assembly, a top plate attachment member, and a replaceable coreless filter element, according to one embodiment of the present invention;

FIG. 2 is a diagrammatic side view of the reusable fluid filter assembly shown in FIG. 1 when assembled, a portion thereof being shown in section and a portion thereof being broken away;

FIG. 3a is an enlarged portion of FIG. 2, showing the threaded connection of the cylindrical housing to the top plate assembly, the threaded connection of the top plate attachment member to the mounting block, thereby urging the top plate towards the block, indexing means for preventing relative rotation of the top plate with respect to the filter mounting base, and the hollow central core threaded in position onto the top plate attachment member and sealingly engaged with the fluid outlet port of the top plate attachment member, according to the preferred embodiment of the present invention;

FIG. 3b is an enlarged portion showing the closed end portion of the cylindrical housing, the annular elastomeric end cap on the open second end of the coreless filter element being biased against the interior surface of the housing, and the resilient inner edge of the annular end cap being biased against the second outer surface of hollow central core which is attached to the closed end of the housing, according to the preferred embodiment of the present invention;

FIG. 4, FIG. 5, and FIG. 6 are enlarged diagrammatic side views of the filter assembly when assembled, a portion thereof being shown in section, showing alternative configurations of the sealing engagement of the open first end of the hollow central core with the fluid outlet port of the top plate attachment member, and showing alternate configurations of the hollow central core, according to other embodiments of the present invention;

FIG. 7, and FIG. 8 are enlarged diagrammatic side views of the filter assembly when assembled, a portion thereof being shown in section, showing the threaded sealing engagement of the open first end of the hollow central core with the fluid outlet port of the top plate attachment member, according to still other embodiments of the present invention;

FIG. 9 is a diagrammatic side view of the top plate attachment member, a portion thereof being shown in section, according to one embodiment of the present invention;

FIG. 10 is a diagrammatic side view of the top plate attachment member, a portion thereof being shown in section, according to a preferred embodiment of the present invention;

FIG. 13a is a diagrammatic view of the top plate assembly having turn-and-lock type connecting means for removably connecting the top plate to the housing, showing slots adjacent the rim, according to one embodiment of the present invention;

FIG. 13b is a diagrammatic side view of the top plate assembly shown in FIG. 13a, a part of it shown in section, showing the turn-and-lock type connecting means for removably connecting the top plate to the housing, and specifically showing a slot in section, according to one embodiment of the present invention; and FIG. 13c is a diagrammatic side view of the housing, showing the turn-and-lock type connecting means, and specifically showing a tab insertable in the slot shown in FIG. 13b, according to one embodiment of the present invention.

BEST MODE FOR CARRYING OUT THE INVENTION

Figure 11:
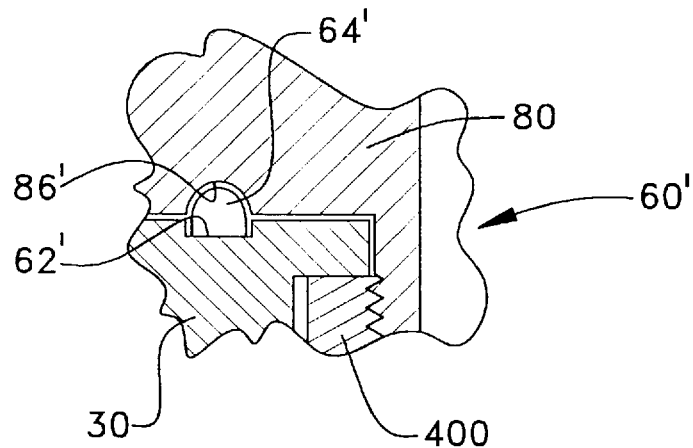
FIG. 11 is a diagrammatic sectional side view of the indexing means disposed in a recess in the top plate and the filter mounting base when the filter assembly is in position, according to the preferred embodiment of the present invention.

Referring to FIG. 1, an exploded perspective view of a reusable fluid filter assembly 10 is shown, which includes a cylindrical housing 20 having a hollow central core 40, a top plate assembly 30, a top plate attachment member 400, and a replaceable coreless filter element 50, according to one embodiment of the present invention. While the preferred embodiment is intended for use as an engine oil filter for internal combustion engines, the filter could be used for a variety of different applications, depending upon the type of filtration media used, for filtering fluids such as hydraulic oil, fuel, and water.

The cylindrical housing 20 has an annular peripheral wall 21, an open end 24 and a closed end 25. The housing 20 has connecting means 200 for removably connecting the housing 20 to the top plate 30, and a hollow central core 40 attached to the closed end 25.

In a preferred embodiment, housing 20 has a first wall portion 22 and a second wall portion 23. The first wall portion 22 starts at the open end 24 of the housing 20 and extends for an axial length, desirably no greater than about one-third the outer diameter of the housing 20. The thickness of the first wall portion 22 is desirably, at least 50% greater than the thickness of the second wall portion 23 because external threads 26 are present on the first wall portion 22 and thus, the greater wall thickness gives the first wall portion greater mechanical strength. In another preferred embodiment, the first wall portion 22 starts at the open end 24 of the housing 20 and extends for an axial length, desirably no greater than about 50 mm, and preferably, no greater than about 40 mm. In the preferred embodiment, the housing 20 is fabricated as a single unit from stainless steel by deep drawing and spinning techniques which are well known to those skilled in the art. Other materials and manufacturing techniques may be employed, for example, a molded plastic housing having an integrally molded hollow central core connected to the housing may be fabricated. In the preferred embodiment, the first wall portion 22 has a thickness, desirably in the range of about 3 mm to about 4 mm and preferably, about 3.5 mm and the second wall portion 23 has a thickness, desirably in the range of about 1 mm to about 2 mm, and preferably, about 1.5 mm. A first wall portion thickness less than 3 mm is undesirable because if the wall is too thin and after external threads are machined therein, the structural integrity of the stainless steel housing and the repeatability of its use would be compromised. Similarly, a second wall thickness less than about 1 mm is undesirable from a structural integrity and durability standpoint. A first wall portion thickness greater than about 4 mm and a second wall thickness greater than about 2 mm is undesirable because it presents practical limitations on the fabrication of the housing and also represents a waste of labor and materials as far as the intended use of the preferred embodiment is concerned. However, in certain applications, one may find it necessary to use an even greater wall thickness, especially for extremely large sized filter assemblies.

As shown in FIG. 2 and FIG. 3a, in the preferred embodiment of the present invention, the connecting means 200 include external threads 26 adjacent the open end 24 and an annular channel 27 adjacent the external threads 26. A first sealing ring 71 is disposed in the annular channel 27. In the preferred embodiment, the annular channel 27 has a rectangular shape. This shape can however be square, circular or polygonal depending upon the type of sealing ring used. In the preferred embodiment, the first sealing ring 71 has a circular cross section and is made from an injection molded elastomeric material, desirably a nitrile rubber. The sealing ring may have other cross section geometries and may be made from a variety of different elastomers, such as hydrogenated nitrile rubber, for example, depending on the desired elastomer properties such as heat resistance, low compression set and/or low brittle point.

Housing 20 also includes a centrally located drain plug housing 29 permanently fixed, by means such as welding, to the closed end 25 of housing 20, as illustrated in FIG. 2. Drain plug housing 29 includes a threaded drain plug 295 therein. Drain plug housing 29 has an outer surface having the shape of a square or a hexagon to enable it to be gripped by a tool, such as a wrench. Housing 20 can be threaded on or off top plate 30 by rotating it with a tool engaged with the drain plug housing 29.

In the preferred embodiment, the hollow central core 40 has a tubular shape, an inner surface 41, an open first end 43 having a first outer surface 42, a middle portion 445 having a middle outer surface 446 and a plurality of fluid outlet perforations 45,45',45" extending from the inner surface 41 to the middle outer surface 446. The hollow central core 40 further has a second end 47 having a second outer surface 470. The first end 43 is disposed in the open end 24 of housing and the second end 47 of core 40 is attached to closed end 25 of the housing. The central core 40 is attached to the closed end 25 of the housing 20 by methods such as welding, if the housing is fabricated from metallic materials, or injection molding, if the housing is constructed from plastic materials. Preferably, the diameter of surface 42 is equal to the diameter of surface 470. The diameter of surface 446 is desirably not substantially greater than the respective diameters of surfaces 42,470 and preferably, equal to or less than the respective diameters of surfaces 42,470. The first end 43 is disposed in the open end 24 of housing and the second end 47 is attached to closed end 25 of the housing.

The hollow central core 40 is sealingly engaged with the fluid outlet port 450 of the attachment member 400. In the preferred embodiment, and as shown in FIG. 4, core 40 is sealingly engaged with the attachment member 400. The open first end 43 of core 40 has an annular groove 447. A third sealing ring 448 is disposed in the annular groove 447. The sealing ring 448 seals against a corresponding peripheral sealing surface 405 adjacent fluid outlet port 450 of the attachment member 400. Other embodiments of the sealing engagement are shown in FIG. 5 and FIG. 6. In another preferred embodiment, as shown in FIG. 7, core 40 is in threaded and sealing engagement with attachment member 400. The open first end 43 of core 40 has external threads 406 for threading into corresponding internal threads 443 of attachment member 400. In an alternate embodiment, as shown in FIG. 8, the open first end 43 of core 40 has internal threads 407 for threading into corresponding external threads 444 of attachment member 400.

The top plate attachment member 400 has a tubular shape, an outer surface 420, a pilot end 430 having internal threads 443 for threading onto corresponding external threads 82 on the filter mounting base 80, and a fluid outlet port 450 extending through the attachment member 400. Referring to FIG. 9 which illustrates an embodiment of the present invention, the member 400 has a pilot diameter, an outer diameter, and a shoulder 460 formed between the pilot diameter and the outer diameter. In this embodiment, the top plate fluid outlet opening 36 has an inner diameter sized to fit loosely around external threads 82 on filter mounting base 80. The pilot diameter of member 400 is desirably of a size sufficient to slip fit inside the inner diameter of the top plate fluid outlet 36 and preferably, about 0.10 mm to 0.50 mm smaller than the inner diameter of outlet 36. The shoulder 460 of member 400 presses against the top plate 30, forming a mechanical contact, and pushes the top plate against the mounting base 80 when the internal threads 443 of the member 400 are threaded into external threads 82 of base 80.

In the preferred embodiment, as shown in FIG. 10, the attachment member 400' has an outer surface 420', internal threads 443', and a fluid outlet port 450'. The outer surface diameter of member 400' is greater than the diameter of top plate outlet 36 to facilitate a good mechanical contact with the top plate. Preferably, the outer surface diameter of member 400' is at least about 15 mm greater than the diameter of outlet 36. In the preferred embodiment, port 450 of attachment member 400 has a surface adapted for being turned by a tool, such as a ratchet wrench or an Allen wrench. As illustrated in FIG. 9 and FIG. 10, such a surface is preferably the outer surface having a hexagonal configuration. It should be recognized however, that a variety of other shapes, such as a square or a polygon could be employed. Further, these shapes could be formed on the inner surface of port 450 as well, particularly when the sealing engagement between core 40 and member 400 has the configuration shown in FIG. 8.

The top plate assembly 30 has a circular shape and has internal threads 32 for mating the external threads 26 of housing 20 and peripheral sealing surface means 34 adjacent internal threads 32. The top plate assembly 30 also has a rim 33, and fluid inlet means 35,35',35" (hereinafter referred to as 35) and fluid outlet means 36 extending through the top plate assembly. The top plate assembly 30 has indexing means 60 for preventing rotation of the top plate 30 with respect to a filter mounting base 80 after the top plate has been secured to the filter mounting base. The first sealing ring 71 forms a first seal in cooperation with the peripheral sealing surface means of the top plate 30 when the external threads 26 of the housing 20 are threaded into the internal threads 32 of the top plate 30. In the preferred embodiment, the peripheral sealing surface means include a peripheral sealing surface 34, as shown in FIG. 3, located between the internal threads 32 and the rim 33 of the top plate 30. Preferably, the first sealing ring 71 disposed in the annular channel 27 of the cylindrical housing 20 is biased against the sealing surface 34 to create the first seal.

As illustrated in FIG. 2 and FIG. 3a, in the preferred embodiment of the present invention, the indexing means 60 include a recess 62 in the top plate 30. The recess is adapted to desirably receive means such as a pin, cog or a key for mating with a corresponding recess in the mounting base. The recess 62 is preferably adapted to receive a guide pin 64 for mating with a corresponding recess 86 in the filter mounting base 80. The guide pin 64 is fitted in the top plate recess 62 and the filter mounting base recess 86 when the top plate 30 is sealably attached to the filter mounting base 80.

Figure 12:
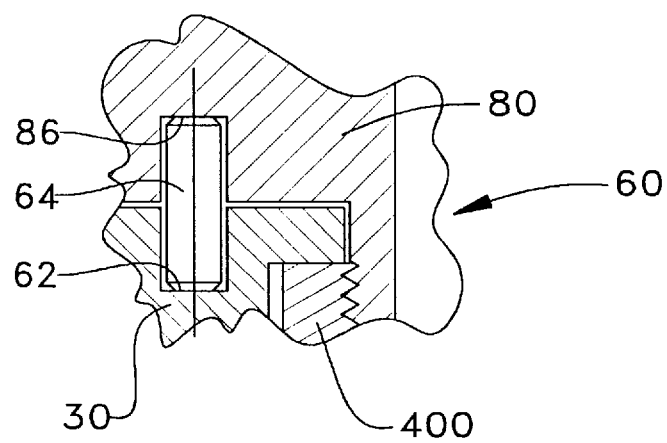
FIG. 12 is a diagrammatic sectional side view of the indexing means disposed in a recess in the top plate and the filter mounting base when the filter assembly is in position, according to another embodiment of the present invention.

As illustrated in FIG. 12, in the preferred embodiment, the guide pin is preferably a cylindrical rod, and the top plate recess and filter mounting base recess are both cylindrical bores, respectively. In one embodiment, the guide pin has a diameter of about 5 mm and a length of about 20 mm. These dimensions can be changed according to the overall dimensions of the top plate and the filter assembly. The top plate bore has a length of about 10 mm and a diameter sufficient for press fitting the guide pin therein. Preferably, the top plate bore has a diameter that is about 0.03 mm to about 0.08 mm greater than the guide pin diameter to facilitate a press fit. The guide pin is press-fitted into the top plate bore so that the pin is held rigidly in the top plate and protrudes from the surface of the top plate by a length of about 10 mm. The corresponding recess in the mounting base 80 preferably has a diameter that is about 0.10 mm to about 0.50 mm greater than the guide pin diameter, to facilitate the guide pin to slip-fit into the recess. An alternate indexing means 60 is illustrated in FIG. 11, showing a semi-circular key 64' located in a recess 62' in the top plate 30 and a corresponding recess 86' in the filter mounting base 80.

The top plate 30 also includes a centrally located fluid outlet opening 36, as illustrated in FIGS. 1, 2 and 3a, sized to slip fit onto the external threads 82 on the filter mounting base 80. Desirably, the opening 36 has a diameter which is no more than about 3 mm greater than the diameter of the threads 82, and preferably about 1.5 mm greater. If the opening 36 is too large, the filter assembly will tend to shift with respect to the filter mounting base and the sealability of the filter assembly to the base will be detrimentally compromised.

In the preferred embodiment, top plate 30 has a circumferential annular channel 37 surrounding the fluid outlet opening 36 as illustrated in FIG. 1 and FIG. 3a. The annular channel 37 has a second sealing ring 72 disposed therein. Preferably, the sealing ring 72 has a circular cross section and is made from an injection molded elastomeric material, desirably a nitrile rubber. The sealing ring may have other cross section geometries and may be made from a variety of different elastomers, such as hydrogenated nitrile rubber, for example, depending on the desired elastomer properties such as heat resistance, low compression set and/or low brittle point. In the preferred embodiment, the sealing ring 72 has a diameter in the range of about 2 mm to about 4 mm. Further, in the preferred embodiment, the second sealing ring 72 is biased against the circumferential sealing surface means 84 of the mounting base 80 to create a second seal when the top plate 30 is urged towards the base 80.

The top plate 30 also includes means for preventing excessive tightening of the housing 20 to the top plate 30, for preventing excessively tight sealing engagement of the core 40 with member 400, for preventing excessive compression of third sealing ring 448, and for indicating positive sealing, when the housing 20 is threaded into top plate 30. Preferably, as shown in FIG. 3a, the means include a mechanical stop 38 formed on the top plate. The mechanical stop 38 provides a mechanical contact between the top plate assembly and the open end of the cylindrical housing. A plurality of ribs 39,39',39" are provided on the inner surface of the top plate 30. The ribs 39 have a length oriented in a radial direction and have a depth oriented in the axial direction, as shown in FIG. 3a.

The replaceable coreless filter element 50 is disposed in housing 20 to define a fluid inlet chamber 52 between the filter element and the housing. The filter element 50 includes a hollow cylindrical fluid outlet chamber 53 which opens to a first open end 54, and a second end 55. The first open end 54 allows filtered fluid to flow through it. The filter element 50 preferably has an outer diameter that is smaller than the inner diameter of housing 20 to allow removal of the filter element 50 through the open end 24 of the housing. Further, the filter element 50 also has an inner diameter that is larger than the outer diameter of the hollow central core 40. Desirably, the filter element 50 has an inner diameter larger than each of the diameter of the first outer surface 42 of first end 43 and second outer surface 470 of second end 47 of the central core 40, and preferably, in the range of about 1% to about 10% larger. The larger inner diameter of the filter element allows the hollow cylindrical fluid outlet chamber 53 to accept the hollow central core 40 therein. If the filter element inner diameter is less than about 1% larger than the first outer surface diameter of the core, the filter will be difficult to install. If the filter element inner diameter is greater than about 10% larger than the first outer surface diameter of the core, the filter will be too loosely placed in the housing and an unevenly spaced fluid chamber will result. Preferably, the annular end caps 56,57 have an inner diameter in the range of 1% to 5% smaller than the outer diameter of surfaces 42,470. If the diameter of end caps 56,57 is more than 5% smaller, the resilient inner sealing surfaces 59,59' of respective end caps 56,57 may get damaged or torn off as they stretch to seal against respective surfaces 42,470 of core 40 when the filter is mounted onto the central core. If the diameter of end caps 56,57 is less than 1% smaller, the resilient inner sealing surfaces 59,59' of respective end caps 56,57 will detrimentally not seal well against respective surfaces 42,470 of core 40 when the filter is mounted onto the central core.

The filter media can be made from a variety of materials, such as paper or synthetic fibers, for example and the present invention is not limited in its scope, to any particular type of filtration media.

In the preferred embodiment, as illustrated in FIG. 3a and 3b, the filter element has an annular end cap 56 on the open end 54, and a solid end cap 57 on the second end 55. The end caps 56,57 are made from elastomeric materials. Preferably, end caps 56,57 are made from polyurethanes having a hardness in the range of about 70 Shore A to 85 Shore A durometer. End cap 56 has a resilient inner edge 58 defined by an opening in the end cap to the hollow cylindrical chamber. The resilient inner edge provides a sealing surface 59.

In the preferred embodiment, as shown in FIG. 3a, when the filter element is snugly fitted onto the central core 40, sealing surfaces 59,59' of element 50 are respectively biased against first and second outer surfaces 42,470 of core 40 and provide a radial seal with surface 42,470. The fluid outlet perforations 45,45',45" of core 40 are also in fluid communication with the hollow cylindrical fluid outlet chamber 53. Also, the surface of end cap 56 is biased against the ribs 39,39' on the inner surface of the top plate. This helps the filter element to fit snugly onto the top plate and the hollow central core. Further, in this position, the fluid inlet holes 35,35' in top plate 30 are in fluid communication with the fluid inlet chamber 52.

As illustrated in FIG. 3b., when the housing is connected to the top plate, end cap 57 on the closed end of the filter is biased against the interior surface 28 of the closed end 25 of the housing. This helps the filter element to fit snugly inside the housing and helps maintain a constant geometry of the fluid inlet chamber 52. Preferably, the second end cap has a plurality of integrally molded urethane tabs that bias against the housing surface 28. In the preferred embodiment, there are three integrally molded tabs on end cap 57.

As shown in FIG. 13a, FIG. 13b and FIG. 13c, in another embodiment of the present invention, the connecting means 200 include a turn-and-lock type means. As used herein, the term "turn-and-lock" means a quick connect and disconnect method well known to those skilled in the art. The turn-and-lock configuration involves a tab or some other form of projection on either the housing or the top plate, that is designed to fit inside a corresponding recess respectively inside the top plate or housing. In one embodiment, top plate 30 has four circumferentially located slots 500,500',500", 500''' (referred to hereinafter as 500). Top plate 30 also has a circumferential sealing surface 510 adjacent slots 500. Housing 20 has four corresponding tabs 502,502',502",502''' (referred to hereinafter as 502). Housing 20 also an annular channel 520 adjacent tabs 502 and a fourth sealing ring 530 disposed in channel 520 for sealing against surface 510 when housing 20 is connected to top plate 30. In the preferred embodiment, the annular channel 520 has a rectangular shape. This shape can however be square, circular or polygonal depending upon the type of sealing ring used. In the preferred embodiment, the fourth sealing ring 530 has a circular cross section and is made from an injection molded elastomeric material, desirably a nitrile rubber.

It should be understood that the present invention is not limited to the preferred embodiment. One skilled in the art may make changes to the size, shape and material of construction of the components within the principles of this invention and to the extent provided by the broad meaning of the appended claims.

INDUSTRIAL APPLICABILITY

The fluid filter assembly 10 is assembled in the following manner. The top plate assembly 30, having an indexing guide pin 60, is mounted on the filter mounting base 80 attached to, say, the engine block, by threading the top plate attachment member 400 to corresponding threads on base 80. Then, the coreless filter element 50 is mounted onto the hollow central core 40 of housing 20, and the resilient urethane end caps 56,57 of the filter element respectively seal against the first and second outer surfaces 42,470 of core 40. The housing 20 is then either threaded onto top plate 30 by hand, or alternatively, connected by a turn-and-lock type configuration. If threaded, the housing is tightened by a tool engaged around the drain plug housing 29.

The sealing between the top plate and the mounting base occurs by a nitrile rubber seal 72. The sealing between the top plate and the housing occurs by a nitrile rubber seal 71. The sealing between the open first end of the core and the fluid outlet port of the attachment member occurs by a nitrile rubber seal 448.

The top plate 30 and attachment member 400 both remain attached to the mounting base on, say, the engine block. Any clockwise or anti-clockwise rotational movement of the top plate with respect to the mounting base is prevented by the indexing pin.

The contaminated and dirty engine oil enters the filter assembly through the fluid inlet holes 35,35' and flows into the fluid inlet chamber 52. The fluid is filtered as it passes radially inward from the fluid inlet chamber 52, through the filtration media, and through the perforations 45,45',45" in the hollow central core 40, into the hollow cylindrical fluid outlet chamber 53. The clean, filtered oil flows through the hollow central core 40, and through the top plate outlet 36 and exits filter assembly 10.

When the filter has to be serviced, the used oil is first drained through the drain plug housing 29 after removing the plug 295, into an environmentally safe disposable container. When the oil has been fully drained from the filter assembly, the housing is disconnected from the top plate. The coreless filter element is replaced with a new coreless element, and new seals 71 and 448 are installed prior to re-connecting the housing to the top plate. The used filter element is disposed in an environmentally safe manner, such as incineration.

To facilitate smooth installation, one may apply a thin layer of oil or other lubrication on the inner surfaces 59,59' of the end caps 56,57 respectively.

The present invention is particularly useful for making oil filters for internal combustion engines used in off-highway trucks, construction equipment, marine applications, power generation equipment, buses, general freight trucks and upper-end recreational vehicles. The present invention is also useful for making hydraulic fluid filters for use in the hydraulic systems of various earth-moving and construction equipment, and fuel filters.

Other aspects, objects and advantages of this invention can be obtained from a study of the drawings, the disclosure and the appended claims.

I claim:

1. A reusable fluid filter assembly, comprising:

a cylindrical housing having an annular peripheral wall, an open end, a closed end, connecting means for removably connecting said open end of said housing to a top plate assembly, and hollow central core having a tubular shape, an inner surface, an open first end having a first outer surface, a middle portion having a middle outer surface and a plurality of fluid outlet perforations extending from said inner surface to said middle outer surface, and a second end having a second outer surface, said first end being disposed in said open end of said housing, means for fixedly connecting said second end to said closed end of said housing;

a top plate assembly having a rim, fluid inlet means and fluid outlet means extending through said top plate assembly, and connecting means for removably connecting said top plate assembly to said open end of said housing;

a top plate attachment member positioned between the first end of said core and said top plate assembly, said top plate attachment member having a tubular shape, an outer surface, a pilot end having internal threads for threading onto corresponding external threads on a filter mounting base, and a fluid outlet port extending through said attachment member;

a replaceable coreless filter element disposed in said housing to define a fluid inlet chamber between said filter element and said housing, said filter element being without any supporting internal core, said filter element having a hollow cylindrical fluid outlet chamber which opens to a first open end of said filter element, allowing filtered fluid to flow therefrom, and having a second open end, said filter element having an outer diameter that is smaller than an inner diameter of said housing to allow removal of said filter element through the open end of said housing, and said filter element having an inner diameter that is larger than the outer diameter of said hollow central core to allow said hollow cylindrical chamber to accept said hollow central core therein;

said fluid inlet means of said top plate being in fluid communication with said fluid inlet chamber defined by said filter element and housing;

said hollow central core extending into said first open end and said hollow cylindrical chamber of said filter element, said fluid outlet perforations of said hollow central core being in fluid communication with said hollow cylindrical chamber of said filter element;

said first and second outer surfaces of said hollow central core sealingly engaging said first and second open ends of said filter element respectively; and said open first end of said hollow central core sealingly engaging said fluid outlet port extending through said attachment member.

2. A fluid filter assembly, as set forth in claim 1, wherein said housing connecting means include external threads adjacent said open end of said housing, an annular channel adjacent said external threads, and a first sealing ring disposed in said annular channel.

3. A fluid filter assembly, as set forth in claim 2, wherein said top plate connecting means include internal threads in said top plate for mating with the external threads adjacent the open end of said housing, and peripheral sealing surface means adjacent said internal threads.

4. A fluid filter assembly, as set forth in claim 3, wherein said first sealing ring forms a first seal in cooperation with said peripheral sealing surface means when the external threads of said housing are threaded into the internal threads of said top plate assembly.

5. A fluid filter assembly, as set forth in claim 4, wherein said peripheral sealing surface means include a sealing surface located between said internal threads and said rim of said top plate.

6. A fluid filter assembly, as set forth in claim 5, wherein said first sealing ring disposed in said annular channel of said cylindrical housing is biased against said sealing surface of said top plate to create said first seal when said top plate assembly is connected to said open end of said housing.

7. A fluid filter assembly, as set forth in claim 6, including means for preventing excessive tightening of said housing to said top plate and indicating positive sealing when said housing is threaded into said top plate, said means including a mechanical stop formed on said top plate, said mechanical stop providing a mechanical contact between said top plate assembly and said open end of said cylindrical housing.

8. A fluid filter assembly, as set forth in claim 1, wherein said housing connecting means and said top plate connecting means are of turn-and-lock type, said housing connecting means including a plurality of external tabs connected to and adjacent the open end of the peripheral wall of said housing for mating with a corresponding plurality of slots formed within and adjacent the rim of said top plate.

9. A fluid filter assembly, as set forth in claim 8, including an annular channel adjacent said external tabs, a first sealing ring disposed in said annular channel, and peripheral sealing surface means adjacent said slots, wherein said first sealing ring forms a first seal in cooperation with said peripheral sealing surface means when the external tabs of said housing are located within corresponding slots of said top plate assembly and when said housing is turned with respect to said top plate to lock said tabs in said slots.

10. A fluid filter assembly, as set forth in claim 1, wherein said assembly includes indexing means for preventing rotation of said top plate with respect to said filter mounting base after said top plate has been secured to said filter mounting base.

11. A fluid filter assembly, as set forth in claim 10, wherein said indexing means include at least one recess in said top plate, said recess being adapted to receive a guide pin for mating with a corresponding recess in said filter mounting base.

12. A fluid filter assembly, as set forth in claim 11, wherein said guide pin is fitted in said top plate recess and said filter mounting base recess when said top plate is sealably attached to said filter mounting base.

13. A fluid filter assembly, as set forth in claim 11, wherein said guide pin is a cylindrical rod and said top plate and filter mounting base recesses are cylindrical bores.

14. A fluid filter assembly, as set forth in claim 1, wherein said top plate has a circumferential annular channel surrounding said fluid outlet opening, and said filter mounting base has circumferential sealing surface means to correspond with a second sealing ring.

15. A fluid filter assembly, as set forth in claim 14, wherein said annular channel has a second sealing ring disposed therein, said second sealing ring being biased against the circumferential sealing surface means of said filter mounting base to create a second seal when said top plate assembly is urged towards said filter mounting bases, when said top plate attachment member is biased towards said top plate by matins the threads of said top plate attachment member with the corresponding threads of said filter mounting base.

16. A fluid filter assembly, as set forth in claim 1, wherein the open first end of said hollow central core includes an annular channel, a third sealing ring disposed in said annular channel, and said top plate attachment member includes corresponding peripheral sealing surface means adjacent said fluid outlet port, wherein said third sealing ring forms a third seal in cooperation with said peripheral sealing surface means when said housing is connected to said top plate.

17. A fluid filter assembly, as set forth in claim 1, wherein the fluid outlet means of said top plate include a centrally located fluid outlet opening sized to slip fit onto external threads on said filter mounting base, and said top plate attachment member has an outer diameter larger than the fluid outlet opening of said top plate.

18. A fluid filter assembly, as set forth in claim 1, wherein the fluid outlet means of said top plate include a centrally located circular fluid outlet opening having an inner diameter sized to fit around external threads on said filter mounting base, and said top plate attachment member has a pilot diameter, an outer diameter, and a shoulder formed between said pilot diameter and said outer diameter, said pilot diameter being of a size sufficient to slip fit inside the inner diameter of said top plate fluid outlet, and said shoulder forming a mechanical contact with said top plate when the internal threads of the pilot end of said attachment member are threaded into corresponding external threads on said filter mounting base.

19. A fluid filter assembly, as set forth in claim 1, including a drain plug in the closed end of said cylindrical housing.

20. A fluid filter assembly, as set forth in claim 1, wherein said cylindrical housing has a first wall portion and a second wall portion, said first wall portion originating from the open end of said housing and extending for an axial length no greater than about one-third an outer diameter of said cylindrical housing.

21. A fluid filter assembly, as set forth in claim 1, wherein said replaceable coreless filter element has first and second annular end caps on said open first and second ends respectively, said annular end caps being made from elastomeric materials, said first and second annular end caps having respective first and second resilient inner edges, said resilient inner edges providing respective first and second sealing surfaces, said first and second sealing surfaces providing a radial seal with a respective first outer surface and a respective second outer surface of said hollow central core.

22. A fluid filter assembly, as set forth in claim 21, wherein said first annular end cap is biased against said top plate, and said second annular end cap is biased against an interior surface of the closed end of said housing, when said open end of said housing is connected with said top plate.

\* \* \* \* \*

UNITED STATES PATENT AND TRADEMARK OFFICE
CERTIFICATE OF CORRECTION

PATENT NO. : 5,846,416
DATED : December 8, 1998
INVENTOR(S) : David F. Gullett It is certified that error appears in the above-identified patent and that said Letters Patent is hereby corrected as shown below:

Please correct the claims as follows:

Column 12, line 37, delete "matins" and insert --mating--

Signed and Sealed this

Twenty-third Day of November, 1999

Attest:

Q. TODD DICKINSON

*Attesting Officer*     *Acting Commissioner of Patents and Trademarks*